United States Patent
Park

(10) Patent No.: US 9,544,856 B2
(45) Date of Patent: Jan. 10, 2017

(54) V2X COMMUNICATION DEVICE AND TRANSMISSION POWER CONTROL METHOD THEREOF

(71) Applicant: MANDO CORPORATION, Pyeongtaek-si, Gyeonggi-do (KR)

(72) Inventor: Man Bok Park, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/877,883

(22) Filed: Oct. 7, 2015

(65) Prior Publication Data

US 2016/0112962 A1 Apr. 21, 2016

(30) Foreign Application Priority Data

Oct. 16, 2014 (KR) ........................ 10-2014-0139753

(51) Int. Cl.

| | |
|---|---|
| H04B 7/00 | (2006.01) |
| H04W 52/24 | (2009.01) |
| H04W 52/04 | (2009.01) |
| H04W 52/00 | (2009.01) |
| H04W 40/08 | (2009.01) |

(52) U.S. Cl.
CPC ........... *H04W 52/243* (2013.01); *H04W 40/08* (2013.01); *H04W 52/00* (2013.01); *H04W 52/04* (2013.01)

(58) Field of Classification Search
CPC .... H04W 52/243; H04W 52/04; H04W 52/00; H04W 40/08
USPC ............... 455/522, 68, 69, 569.2, 575.9, 99, 238.1, 455/297, 345
See application file for complete search history.

(56) References Cited

U.S. PATENT DOCUMENTS

| | | | | |
|---|---|---|---|---|
| 7,526,255 B2* | 4/2009 | Kruys | ................... | H04W 16/14 370/342 |
| 2010/0020864 A1* | 1/2010 | Matsuo | ................ | H04B 1/7172 375/239 |
| 2013/0162442 A1* | 6/2013 | Honda | ................... | G08C 17/02 340/870.02 |

FOREIGN PATENT DOCUMENTS

KR 1020130141923 A 12/2013

OTHER PUBLICATIONS

Korean Office Action dated Nov. 3, 2015 in connection with the counterpart Korean Patent Application No. 10-2014-0139753.

* cited by examiner

*Primary Examiner* — Dominic Rego
(74) *Attorney, Agent, or Firm* — Hauptman Ham, LLP

(57) ABSTRACT

A V2X communication device includes a communication unit, an occupancy time calculation unit, a power control unit. The communication unit supports communication between a vehicle and an object. The occupancy time calculation unit calculates at least one of a radio wave occupancy time, in which data is transmitted/received through the communication unit in each communication period, and a radio wave non-occupancy time, in which the data is not transmitted/received in each communication period. The power determination unit determines whether to adjust the data transmission power based on at least one of the radio wave occupancy time and the radio wave non-occupancy time, which are calculated by the occupancy time calculation unit. The power control unit adjusts and controls the data transmission power according to the determination from the power determination unit.

16 Claims, 5 Drawing Sheets

V2X COMMUNICATION DEVICE AND TRANSMISSION POWER CONTROL METHOD THEREOF

CROSS-REFERENCE TO RELATED APPLICATION

This application claims priority from and the benefit under 35 U.S.C. §119(a) of Korean Patent Application No. 10-2014-0139753, filed on Oct. 16, 2014, which is hereby incorporated by reference for all purposes as if fully set forth herein.

BACKGROUND OF THE INVENTION

1. Field of the invention

The present invention relates to a V2X communication device and a transmission power control method thereof. More particularly, the present invention relates to a V2X communication device that controls the increase/decrease of a transmission power such that a proper quantity of data can be transmitted/received according to a radio wave occupancy time or radio wave non-occupancy time when transmitting/receiving data to/from a vehicle so that the collision of data can be minimized. The present invention also relates to a transmission power control method of the V2X communication device.

2. Description of the Prior Art

Recently, V2X (Vehicle to Everything) communication has been developed. The V2X communication includes V2V communication which is vehicle-to-vehicle communication, V2I communication which is vehicle-to-infrastructure communication, and V2N communication which is vehicle-to-nomadic device communication.

The V2X communication forms a network using vehicle-to-vehicle communication, vehicle-to-infrastructure communication, and vehicle-to-nomadic device communication, and transmits/receives various pieces of information through the network so that traffic information, route guidance, various multimedia contents, etc. are shared in order to perform various functions, such as ensuring traffic safety and preventing traffic congestion.

When data is transmitted or received using such V2X communication, an inter-data collision may occur. Currently, in order to prevent the inter-data collision, various collision avoidance logics are applied. Among them, a CSMA/CA (Carrier Sense Multiple Access with Collision Avoidance) system causes a transmission side to sense the line status of a reception side, and when a channel is on the inactive status, causes the transmission side to wait for a predetermined time period and then to transmit the data. While the CMSA/CA system is designed to minimize the inter-data collision, the inter-data collision is still unavoidable. Meanwhile, in a case where data is transmitted/received through wireless communication, since different radio wave intensities may be generated depending on communication environments, it is impossible to determine whether there is a data collision using the radio wave intensity while receiving data. Thus, it is necessary to find a method to avoid the data collision as much as possible.

SUMMARY OF THE INVENTION

The present invention proposes a V2X communication device, which controls the increase/decrease of transmission power such that a proper quantity of data can be transmitted/received according to an radio wave occupancy time or a radio wave non-occupancy time when transmitting/receiving data to/from a vehicle so as to minimize data collision so that a data transmission efficiency can be improved, and transmission power control method thereof.

In accordance with an aspect of the present invention, there is provided a V2X communication device including: a communication unit that supports a communication between a vehicle and an object; an occupancy time calculation unit that calculates at least one of a radio wave occupancy time, in which data is transmitted/received through the communication unit in each communication period, and a radio wave non-occupancy time, in which the data is not transmitted/received in each communication period; a power determination unit that determines whether to adjust the data transmission power based on at least one of the radio wave occupancy time and the radio wave non-occupancy time, which are calculated by the occupancy time calculation unit; and a power control unit that adjusts and controls the data transmission power according to the determination from the power determination unit.

According to another aspect of the present invention, there is provided a transmission power control method of a V2X communication device. The method includes: calculating, when data is transmitted/received within a communication network for communicating with a vehicle, a radio wave occupancy time, in which data is transmitted/received in each communication period, and a radio wave non-occupancy time, in which the data is not transmitted/received in each communication period; and adjusting and controlling a data transmission power based on the radio wave occupancy time and the radio wave non-occupancy time.

The present invention may check a transmitted/received amount of data using a sum of radio wave occupancy times within a communication period and a sum of radio wave non-occupancy times, and when the transmitted/received quantity of data is too large or too small, may perform a control to adjust the data transmission power based on the monitoring result obtained for a plurality of communication periods. As a result, by adjusting a range, in which the data is capable of being transmitted/received, so as to adjust the transmitted/received quantity of data, it is possible to minimize data collision and to improve the data transmission efficiency.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
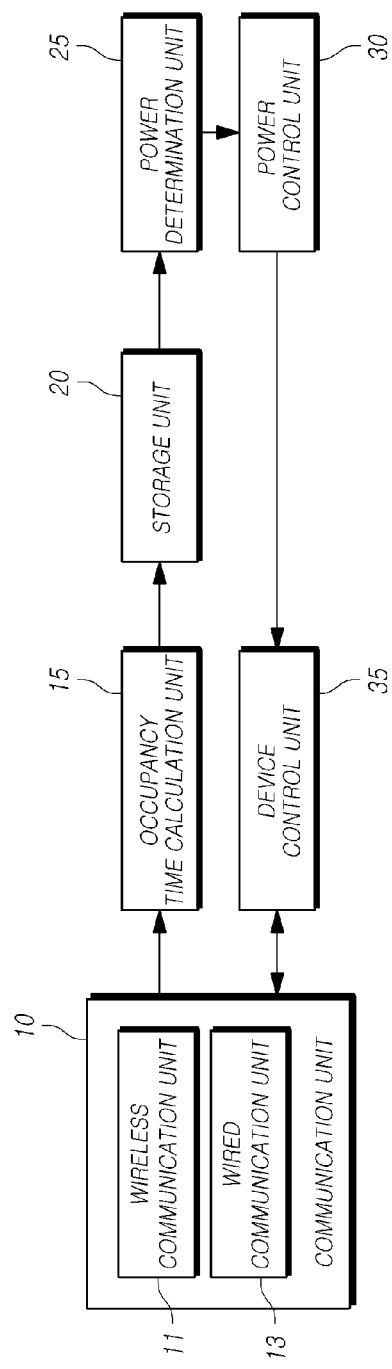
FIG. 1 is a configuration block diagram of a V2X communication device according to an embodiment of the present invention.

Hereinafter, some embodiments of the present invention will be described in detail with reference to illustrative drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a configuration block diagram of a V2X communication device according to an embodiment of the present invention.

A V2X communication device 1 according to the present invention is a device that is used for V2X communication, and may be used by being mounted on various objects that communicate with a vehicle. That is, the V2X communication device 1 may not only be mounted on a vehicle, but also on a roadside device, a nomadic device, or the like.

The V2X communication device 1 according to the present invention enables a radio wave transmission power to be adjusted and controlled based on a radio wave non-occupancy time or a radio wave occupancy time of data in order to prevent data from colliding at the time of V2X communication.

As illustrated in FIG. 1, the V2X communication device 1 may include a communication unit 10 to communicate between a vehicle and an object, an occupancy time calculation unit 15 that calculates a radio wave non-occupancy time that is not occupied by data at the time of data transmission/reception, a storage unit 20 that sores the radio wave non-occupancy time for a plurality of communication periods, power determination unit 25 that determines whether to adjust the data transmission power based on a radio wave non-occupancy time, a power control unit 30 that adjusts and controls the transmission power according to the determination from the power determination unit 25, and a device control unit 35 that controls data transmission/reception.

The communication unit 10 supports vehicle-to-roadside device communication, vehicle-to-nomadic device communication, and vehicle-to-vehicle communication, and may be provided in a state where it is divided into a wireless communication unit 11 and a wired communication unit 13 as needed.

The wireless communication unit 11 supports wireless own vehicle-to-peripheral vehicle communication, and wireless own vehicle-to-roadside device communication, and the communication unit 10 may use a wireless communication system, such as WiFi or Wibro. The communication unit 11 may use a Dedicated Short Range Communication (DSRC) system of 5.8 GHz bandwidth, which is excellent in accuracy and rapid in temporal communication speed.

The wired communication unit 13 may support a TCP/IP protocol base communication, and may only be provided in the roadside device or may also be provided in the vehicle and the nomadic device. The wired communication unit 13 provided in the roadside device may support the roadside device to perform wired communication with another roadside device or a management server. When the wired communication unit 13 is provided in the vehicle and the nomadic device, the wired communication unit 13 may be designed such that it only operates when it is connected with an external device over a wire.

The occupancy time calculation unit 15 may calculate a sum of radio wave non-occupancy times in which data is not transmitted/received in a communication period that is a data transmission/reception period of the V2X communication device 1.

Figure 2:
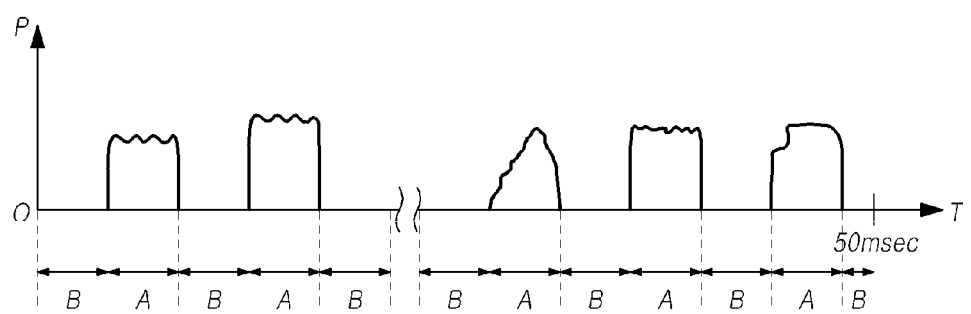
FIG. 2 illustrates a graph for an arbitrary communication period in which radio wave occupancy times and radio wave non-occupancy times are included.

FIG. 2 illustrates a graph for an arbitrary communication period in which radio wave occupancy times and radio wave non-occupancy times are included. As illustrated, the data communication period in the V2X communication device 1 is set to a predetermined length of time, and for the communication period, the radio wave occupancy times and the radio wave non-occupancy times appear alternately.

Here, the radio wave occupancy time refers to a time in which a frequency is occupied by data transmission among a vehicle, a roadside device, and a nomadic device. In the case of the vehicle, the frequency may be occupied by data transmitted from the roadside device, any other vehicle, and/or the nomadic device. In the case of the roadside device, the frequency may be occupied by data transmitted from peripheral vehicles, and in the case of the nomadic device, the frequency may be occupied by the data transmitted by the vehicle.

The communication period means a period in which each vehicle transmits information during the V2X communication. The communication period is defined in various V2X communication protocols, and may be 50 ms or 100 ms.

Meanwhile, a radio wave using time per one time required by a vehicle to transmit information once is also defined by a predetermined value.

Accordingly, for one communication period, a specific vehicle may receive information from N other vehicles around the specific vehicle, and the radio wave occupancy time may be determined by the product of the radio wave using time per one time and N under the assumption that the signals received from the N other vehicles do not overlap with each other.

However, since the radio wave using time per one time of a vehicle may be variable and the signals from two or more vehicles may collide (overlap) with each other, the radio wave occupancy time is not always determined by the relationship described above. As will be described below, the radio wave occupancy time may be determined by analyzing, by the occupancy time calculation unit 15, a radio wave reception profile or the like.

The occupancy time calculation unit 15 may calculate the sum of radio wave occupancy times by adding respective radio wave occupancy times indicated by "A" sections in FIG. 2 in each communication period, and may calculate the sum of radio wave non-occupancy time indicated by "B" sections by subtracting the calculated sum of radio wave occupancy times from the communication period time. For example, when the communication period is set to 50 msec and the sum of radio wave occupancy times is 30 msec, the sum of radio wave non-occupancy times becomes 20 msec.

At this time, the radio wave occupancy time may be defined as the total time required by the communication unit for receiving data within a predetermined communication period, but is not limited thereto. The radio wave occupancy time may be defined as a time that is obtained by adding a signal transmission time and a signal reception time.

However, since the object of the present invention is to improve reception collision of radio waves, the radio wave occupancy time may preferably be a total time required for receiving data within a predetermined communication period.

The sum of radio wave non-occupancy times, calculated by the occupancy time calculation unit 15, is stored in the storage unit 20 and then provided to the power control unit 30.

In the storage unit 20, the sum of radio wave non-occupancy times is stored for a plurality of pre-set communication periods, and when the plurality of pre-set communication periods are completed, the sum of radio wave non-occupancy times for each stored communication period may be transferred to the power determination unit 25.

The power determination unit 25 may determine whether to adjust the data transmission power transmitted from the V2X communication device 1 by using the sum of radio wave non-occupancy times which is calculated by the occupancy time calculation unit 15.

The power determination unit 25 may determine whether to adjust the transmission power through a process of confirming, by comparing the sum of radio wave non-occupancy times with a first threshold and a second threshold that have been pre-set, whether the sum of radio wave non-occupancy times exceeds the first threshold or is smaller than the second threshold, and a process of confirming whether an event has occurred repeatedly through a plurality of communication periods.

Here, the first threshold is a standard for performing an adjustment so as to prevent the sum of radio wave non-occupancy times from becoming excessively long. When the sum of radio wave non-occupancy times exceeds a first threshold, the power determination unit 25 monitors a plurality of communication periods stored in the storage unit 20. As a result of monitoring, when the sum of radio wave non-occupancy times exceeds the first threshold in a pre-set number of communication periods among the plurality of communication periods, the power determination unit 25 may make a determination to increase the transmission power.

The second threshold is a standard for performing an adjustment so as to prevent the sum of radio wave non-occupancy times from becoming excessively short. When the sum of radio wave non-occupancy times is less than the second threshold, the power determination unit 25 monitors the plurality of communication periods stored in the storage unit 20. As a result of monitoring, when the sum of radio wave non-occupancy times is less than the second threshold in a pre-set number of communication periods among the plurality of communication periods, the power determination unit 25 may make a determination to decrease the transmission power.

The first threshold is larger than the second threshold by a pre-set difference, and the extent of each of the first threshold and the second threshold may be determined within an optimal range in which the data collision can be minimized and the data transmission efficiency can be maximized.

The power determination unit 25 may transfer the sum of radio wave non-occupancy times and the first threshold or the second threshold to the power control unit 30 so as to request an increase or decrease of the transmission power. At this time, when it is determined to increase the transmission power, the power determination unit 25 transfers the sum of radio wave non-occupancy times and the first threshold to the power control unit 30. Whereas, when it is determined to decrease the transmission power, the power determination unit 25 transfers the sum of radio wave non-occupancy times and the second threshold to the power control unit 30.

The power control unit 30 may calculate the transmission power of a signal to be transmitted from the V2X communication device 1 according to the result determined by the power determination unit 25, and may perform an adjustment such that the data can be transmitted with the calculated transmission power.

The power control unit 30 may calculate the transmission power using Equation 1 as follows.

$$P = k_P(a - a_{th}) + P_{old} \qquad \text{[Equation 1]}$$

Here, P is a new transmission power, $P_{old}$ is a current transmission power, $k_P$ is a control gain, a is the sum of radio wave non-occupancy times, and ath is a first threshold or a second threshold.

When the sum of radio wave non-occupancy times is larger than the first threshold, the value of $a-a_{th}$ becomes a positive (+) value so that the new transmission power will increase as compared to the current transmission power, and when the sum of radio wave non-occupancy times is smaller than the second threshold, the value of $a-a_{th}$ becomes a negative (−) value so that the new transmission will decrease as compared to the current transmission power.

Figure 3:
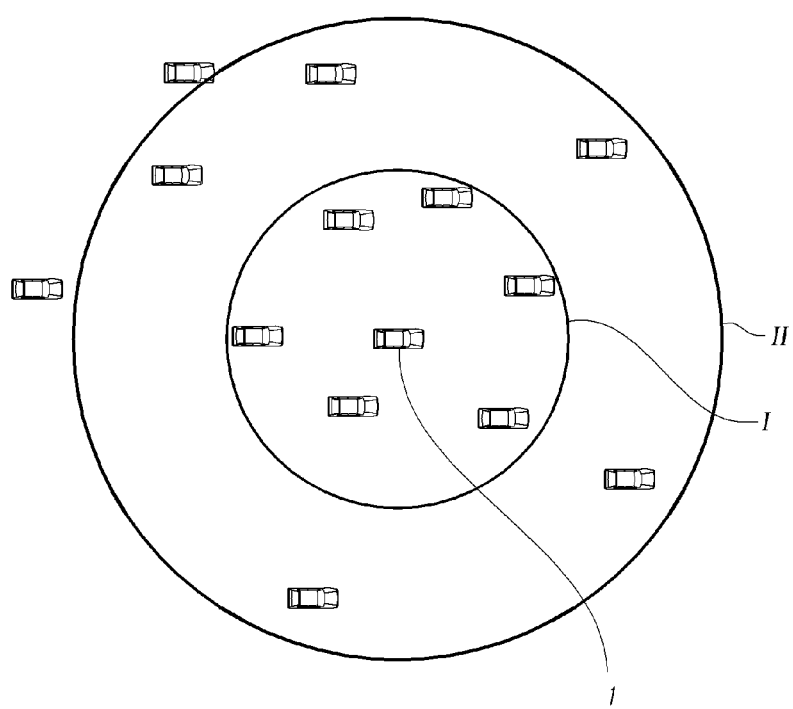
FIG. 3 is an exemplary view illustrating a state in which transmission power is adjusted by the V2X communication device so that a region, where transmission is enabled, is adjusted.

When the transmission power increases according to the control in the power control unit 30, the radius, in which data can be transmitted from the V2X communication device 1, is widened from I to II as illustrated in FIG. 3 so that communication with more vehicles, roadside devices, and nomadic devices will be enabled. As a result, the transmission quantity of data increases so that the radio wave non-occupancy time will decrease.

Whereas, when the transmission power decreases, the radius, in which the data can be transmitted from the V2X communication device 1, is narrowed so that the number of vehicles, roadside devices, and nomadic devices decreases, which are capable of performing a communication, will decrease. As a result, the transmission quantity of data decreases so that the radio wave non-occupancy time will increase.

The device control unit 35 may control data transmission/reception through the communication unit 10, and may control the operations of the occupancy time calculation unit 15, the storage unit 20, the power determination unit 25, and the power control unit 30.

In addition, the device control unit 35 may additionally include a function of transmitting, when the transmission power is changed in the power determination unit 20, information for the changed transmission power to other external vehicles.

In an environment where a plurality of vehicles are densely concentrated as illustrated in FIG. 3, even if some vehicles change the power, the object pursued by the present invention may not be fully achieved as long as the power of the remaining vehicles is not changed.

For example, even if a first vehicle reduces the power to a predetermined range because vehicles are densely concentrated therearound but the transmission power of the remaining vehicles is still in a strong state, the received radio wave occupancy time of the first vehicle is maintained at a predetermined level or more so that the collision of radio wave reception may still occur.

On the contrary, when the first vehicle increases the power within a predetermined range because there are few vehicles therearound, but the transmission power of the remaining vehicles is still low, it is probable that the radio wave occupancy time of the first vehicle is still too low.

At this time, the problems as described above may not occur if the other vehicles also conduct the power control function according to the present invention. However, there may also be a case in which the peripheral other vehicles do not conduct the power control according to the present invention.

Accordingly, in preparation for such a case, the V2X communication device may include a function of transmitting, when changing the transmission power, information for the changed power to other vehicles so as to guide the other vehicles to change the power in a similar manner so that the entire communication environment can be optimally maintained.

Figure 4:
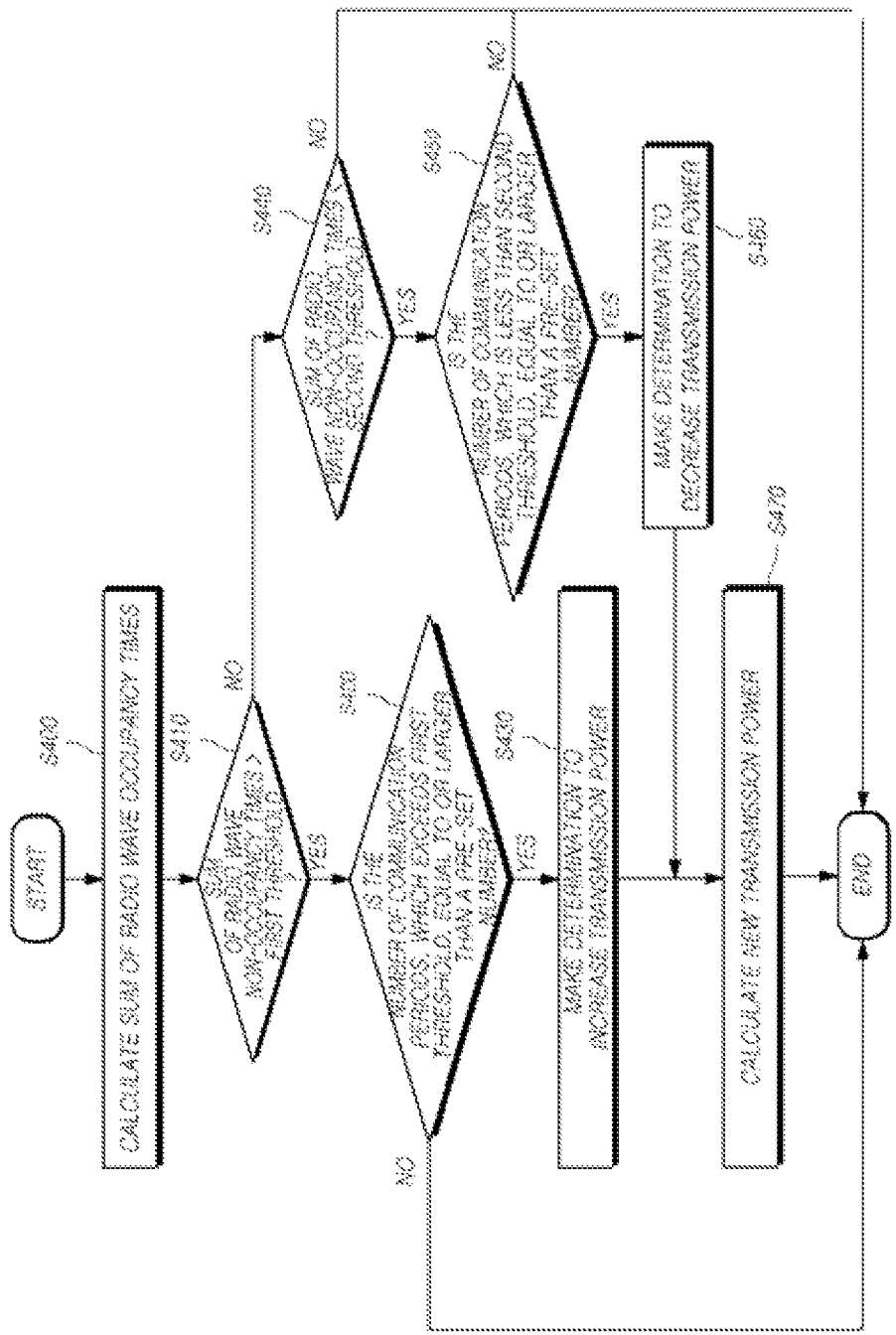
FIG. 4 is a flowchart illustrating a process of controlling transmission power in the V2X communication device according to an embodiment of the present invention.

Hereinafter, a process for controlling the transmission power in the V2X communication device 1 by the configuration described above will be described with reference to FIG. 4.

When data is transmitted/received through the communication unit 10, the occupancy time calculation unit 15 calculates the sum of radio wave occupancy times in each communication period, and calculates the sum of radio wave non-occupancy times by subtracting the sum of radio wave occupancy times from the entire time of the communication period (S400).

For the plurality of communication periods, the sum of radio wave non-occupancy times is stored in the storage unit 20, and the power determination unit 25 compares the sum of radio wave non-occupancy times with the first threshold and the second threshold. As a result of comparison, when the sum of radio wave non-occupancy times is larger than the first threshold or smaller than the second threshold, the power determination unit 25 makes a determination to increase/decrease the transmission power according to a progress for the plurality of communication periods.

At this time, when the sum of radio wave non-occupancy times is larger than the first threshold (S410), the power determination unit 25 determines whether the number of communication periods, in which the sum of radio wave non-occupancy times is larger than the first threshold, exceeds a pre-set number (S420), and when exceeding the pre-set number, makes a determination to increase the transmission power (S430).

On the contrary, when the sum of radio wave non-occupancy times is smaller than the second threshold (S440), the power determination unit 25 determines whether the number of communication periods, in which the sum of radio wave non-occupancy times is smaller than the second threshold, exceed a pre-set number (S450), and when exceeding the pre-set number, makes a determination to decrease the transmission power (S460).

According to the determination of the power determination unit 25, the power control unit 30 calculates a new transmission power using Equation 1 (S470), and causes data to be transmitted with the calculated new transmission power.

Meanwhile, while the above-described embodiment determines how to adjust the transmission power based on the sum of radio wave non-occupancy times, it is possible to determine how to adjust the transmission power based on the sum of radio wave occupancy times. Next, this embodiment will be described with reference to FIG. 1. Since the constituent elements to be described later are the same as those illustrated in FIG. 1, the same constituent elements will be denoted by the same reference numerals in the following description.

The occupancy time calculation unit 15 of the present embodiment calculates the sum of radio wave occupancy times, and transfers the calculated sum to the power determination unit 25.

When the sum of radio wave occupancy times exceeds a third pre-set threshold and the number of communication periods, in which the sum exceeds the third threshold, exceeds a pre-set number, the power determination unit 25 may make a determination to decrease the transmission power. In addition, when the sum of radio wave occupancy times is less than a fourth pre-set threshold and the number of communication periods, in which the sum of radio wave occupancy times is less the pre-set fourth threshold, exceeds a pre-set number, the power determination unit 25 may make a determination to increase the transmission power.

The power control unit 30 may calculate a new transmission power using Equation 2 as follows.

$$P = k_P(a'_{th} - a') + P_{old} \quad \text{[Equation 2]}$$

Here, P is a new transmission power, $P_{old}$ is a current transmission power, $k_P$ is a control gain, a' is a sum of radio wave occupancy times, and $a'_{th}$ is a third threshold or a fourth threshold.

Figure 5:
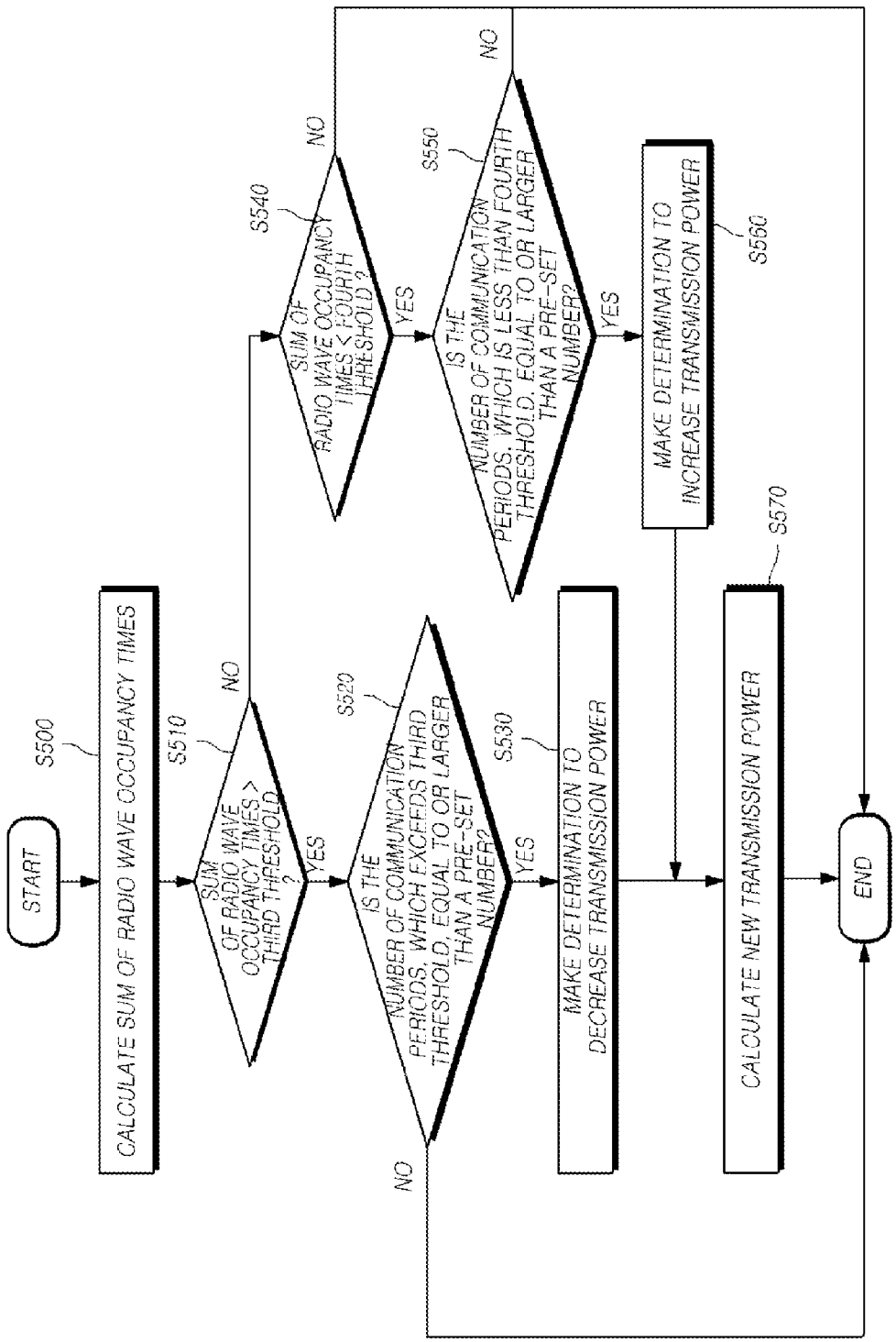
FIG. 5 is a flowchart illustrating a process of controlling transmission power in the V2X communication device according to another embodiment of the present invention.

Next, a process of controlling the transmission power by the V2X communication device 1 in such an embodiment will be described with reference to FIG. 5.

When data is transmitted/received through the communication unit 10, the occupancy time calculation unit 15 calculates the sum of radio wave occupancy times in each communication period (S500).

For a plurality of communication periods, the sum of radio wave occupancy times is stored in the storage unit 20, and the power determination unit 25 compares the sum of radio wave occupancy times with the third threshold and the fourth threshold. As a result of comparison, when the sum of radio wave occupancy times is larger than the third threshold or smaller than the fourth threshold, the power determination unit 25 makes a determination to increase/decrease the transmission power according to the progress for the plurality of communication periods.

At this time, when the sum of radio wave occupancy times is larger than the third threshold (S510), the power determination unit 25 determines whether the number of communication periods, in which the sum of radio wave occupancy times is larger than the third threshold, exceeds a pre-set number (S520), and when exceeding the pre-set number, makes a determination to decrease the transmission power (S530).

On the contrary, when the sum of radio wave occupancy times is smaller than the fourth threshold (S540), the power determination unit 25 determines whether the number of communication periods, in which the sum of radio wave occupancy times is smaller than the fourth threshold, exceeds a pre-set number (S550), and when exceeding the pre-set number, makes a determination to increase the transmission power (S560).

The power control unit 30 calculates the new transmission power using Equation 2 according to the determination of the power determination unit 25, and causes the data to be transmitted with the calculated new transmission power (S570).

In addition, although not illustrated, when the transmission power is changed in transmission power determination steps (S530, S560), a transmission step for transmitting the changed transmission power to the outside may be further provided.

As described above, the present invention checks the transmitted/received quantity of data using a sum of radio wave occupancy times and a sum of radio wave non-occupancy times in a communication period, and when the transmission/reception quantity of data is too many or too small, a control may be performed to adjust the data transmission power using the monitoring result obtained for a plurality of communication periods. As a result, by adjusting the range in which data can be transmitted/received, the quantity of transmitted/received data can be adjusted, and the data collision can be minimized so that the data transmission efficiency can be improved.

The standard contents or standard documents mentioned in the above-described embodiments are omitted in order to simplify the description of the specification, but form a part of the present specification. Accordingly, adding the above-mentioned standard contents and the contents of some of the standard documents to the present specification, or describing the above-mentioned standard contents and the contents of some of the standard documents in the claims shall be interpreted to belong to the scope of the present invention.

Although the embodiments of the present invention have been described for illustrative purposes, those skilled in the art will appreciate that various modifications, additions and substitutions are possible, without departing from the scope and spirit of the invention. Therefore, exemplary aspects of the present disclosure have not been described for limiting purposes. The scope of the present invention shall be construed on the basis of the accompanying claims in such a manner that all of the technical ideas included within the scope equivalent to the claims belong to the present invention.

What is claimed is:

1. A V2X (Vehicle to Everything) communication device comprising:
    a communication unit that supports communication between a vehicle and an object;
    an occupancy time calculation unit that calculates at least one of a radio wave occupancy time, in which data is received through the communication unit in each communication period, and a radio wave non-occupancy time, in which the data is not received in each communication period;
    a power determination unit that determines whether to adjust the data transmission power based on at least one of the radio wave occupancy time and the radio wave non-occupancy time, which are calculated by the occupancy time calculation unit; and
    a power control unit that adjusts and controls the data transmission power according to the determination from the power determination unit.

2. The V2X communication device of claim 1, wherein the occupancy time calculation unit calculates a sum of radio wave occupancy times in which the data is received in each communication period, and calculates a sum of radio non-occupancy times by subtracting the sum of radio wave occupancy times from a total time of each communication period.

3. The V2X communication device of claim 1, wherein, when the sum of radio wave non-occupancy times exceeds a pre-set first threshold and, among a plurality of communication periods, the number of communication periods, in which the sum of radio wave non-occupancy times exceeds the first threshold, is equal to or larger than a pre-set number, the power determination unit makes a determination to increase the transmission power.

4. The V2X communication device of claim 1, wherein, when the sum of radio wave non-occupancy times is less than a pre-set second threshold and, among a plurality of communication periods, the number of communication periods, in which the sum of radio wave non-occupancy times is less than the second threshold, exceeds a pre-set number, the power determination unit makes a determination to decrease the transmission power.

5. The V2X communication device of claim 1, wherein the power control unit calculates transmission power to be newly applied based on a difference between the sum of radio wave non-occupancy times and the pre-set first threshold and the pre-set second threshold.

6. The V2X communication device of claim 1, wherein, when the sum of radio wave occupancy times exceeds a pre-set third threshold and, among a plurality of communication periods, the number of communication periods, in which the sum of radio wave occupancy times exceeds the third threshold, is equal to or larger than a pre-set number, the power determination unit makes a determination to decrease the transmission power.

7. The V2X communication device of claim 1, wherein, when the sum of radio wave occupancy times is less than a pre-set fourth threshold and, among a plurality of communication periods, the number of communication periods, in which the sum of radio wave occupancy times is less than the fourth threshold, exceeds a pre-set number, the power determination unit makes a determination to increase the transmission power.

8. The V2X communication device of claim 1, wherein the power control unit calculates transmission power to be newly applied based on a difference between the sum of radio wave occupancy times and the pre-set third threshold and the pre-set fourth threshold.

9. The V2X communication device of claim 1, wherein the communication unit transmits, when the transmission power is changed by the power determination unit, information for the changed transmission power to outside.

10. A transmission power control method of a V2X (Vehicle to Everything) communication device, the method comprising:
    calculating, when data is transmitted within a communication network to communicate with a vehicle, a radio wave occupancy time, in which data is received in each communication period, and a radio wave non-occupancy time, in which the data is not received in each communication period; and
    adjusting and controlling the data transmission power based on the radio wave occupancy time and the radio wave non-occupancy time.

11. The method of claim 10, wherein the calculating includes:
    calculating a sum of radio wave occupancy times in which data is received in each communication period; and calculating a sum of radio wave non-occupancy times by subtracting the sum of radio wave occupancy times from a total time of each communication period.

12. The method of claim 10, wherein the controlling includes:
comparing the sum of radio wave non-occupancy times with a pre-set first threshold or a pre-set second threshold;
determining an adjustment of the transmission power when a state, in which the sum of radio wave non-occupancy times exceeds the first threshold or is less than the second threshold is repeated a pre-set number of times or more within a plurality of communication periods as a result of the comparing.

13. The method of claim 12, wherein the controlling further includes:
calculating transmission power to be newly applied based on a difference between the sum of radio wave non-occupancy times and the first threshold or the second threshold.

14. The method of claim 10, wherein the controlling includes:
comparing the sum of radio wave occupancy times with a pre-set third threshold or a pre-set fourth threshold;
determining an adjustment of the transmission power when a state, in which the sum of radio wave occupancy times exceeds the third threshold or is less than the fourth threshold, is repeated a pre-set number of times or more within a plurality of communication periods, as a result of the comparing.

15. The method of claim 14, wherein the controlling:
calculating transmission power to be newly applied based on a difference between the sum of radio wave occupancy times and the third threshold or the fourth threshold.

16. The method of claim 10, further comprising:
transmitting, when the transmission power is changed in the controlling, information on the changed transmission power to outside.

* * * * *